May 12, 1931. H. H. SEMMES 1,805,190
BRAKE OPERATOR
Filed June 4, 1929
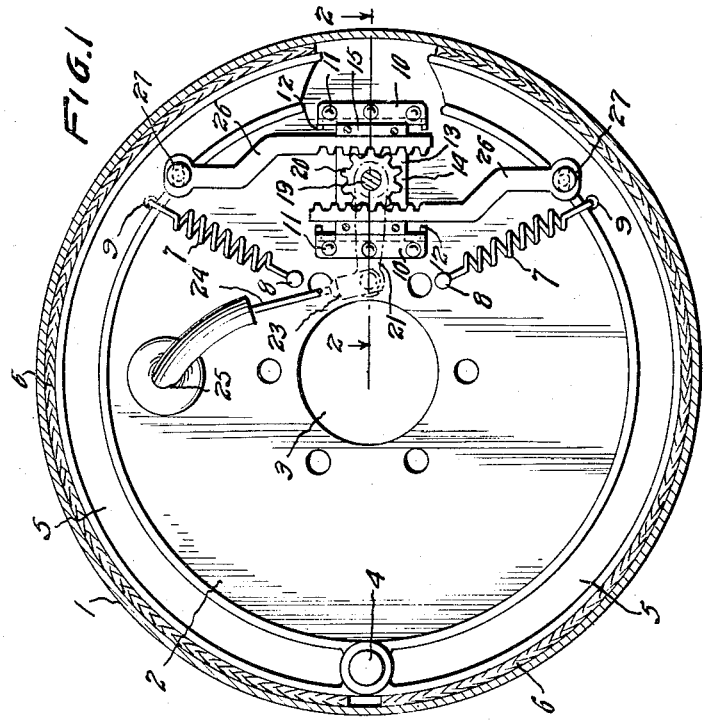
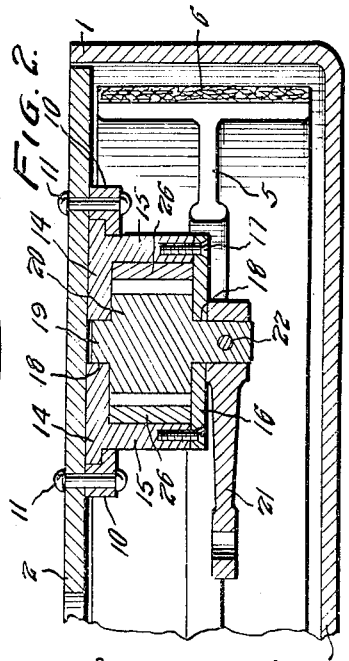
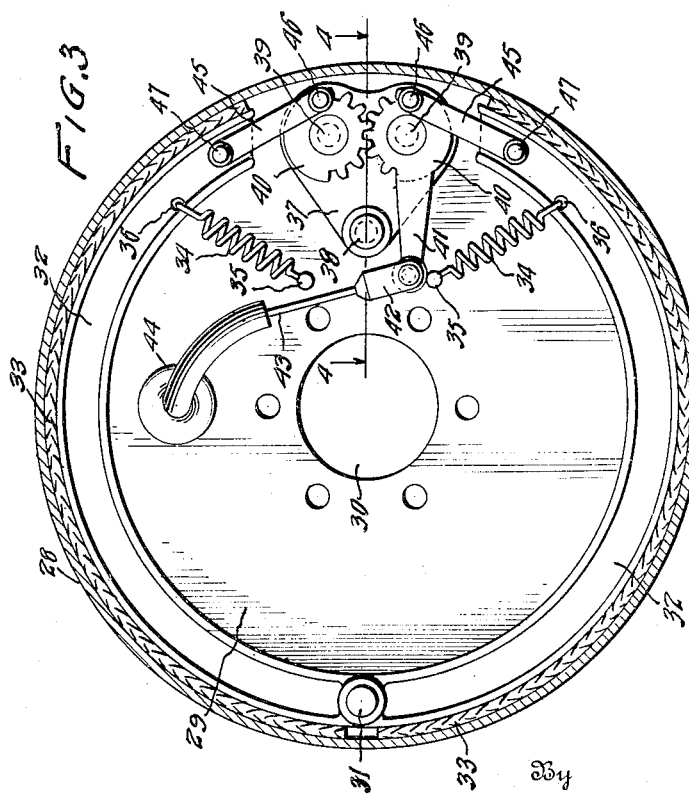
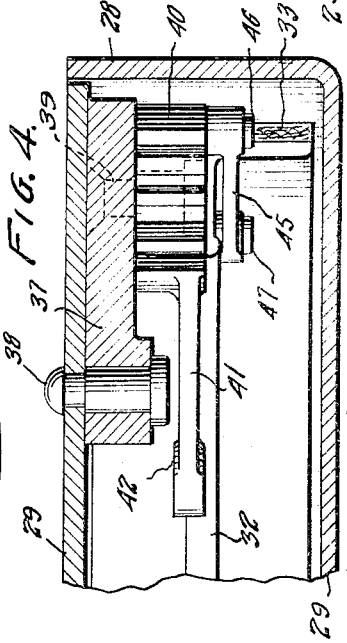
Inventor
HARRY. H SEMMES
By Semmes & Semmes
Attorney Patented May 12, 1931

1,805,190

UNITED STATES PATENT OFFICE

HARRY H. SEMMES, OF CHEVY CHASE, MARYLAND, ASSIGNOR TO BENDIX BRAKE COMPANY, OF SOUTH BEND, INDIANA, A CORPORATION OF ILLINOIS

BRAKE OPERATOR

Application filed June 4, 1929. Serial No. 368,389.

The invention relates in general to vehicle brakes and more particularly has reference to the equalizer mechanism for brakes.

Brake mechanisms, provided with operators which cause each brake shoe to engage the drum with an equal retarding force, are well known in the art and have been successfully applied to brakes of the internal expanding type.

One particular form of operator comprises a cam mounted on a floating shaft. Another type comprises a floating cam mounted on a fixed shaft. In both of these types of operator the rotation of the shaft causes the cam to engage the free ends of the brake shoes and expand them. Since either the cam or the shaft to which it is fixed is floated, the cam moves in such a direction that the force exerted on each shoe will be equalized.

A serious defect in operators of the cam type lies in the fact that the surfaces of the cam engaging the brake shoes are subjected to considerable wear. This wear can reach such a condition that the efficiency of the brake will be greatly impaired. To overcome this, specially shaped cams and cams equipped with hardened wear surfaces have been employed. However all of these, because of their special shape or the complicated structure, consisting of a multiplicity of parts, have been expensive to manufacture and have not been completely successful in preventing wear on the cam itself.

I am aware that brake operators comprising intermeshing gears connected to the brake shoes have been constructed. Such operators are of the rack and pinion and of the sector gear type.

These operators have many advantages which the previously mentioned type does not possess. They are of simple construction and their parts are comparatively inexpensive. Moreover in operators of the gear type, there is no localized surface which can be subjected to wear by bearing against the ends of the brake shoes as in the instance of the cam operators. As it is well known, the bearing area between two intermeshing gears is comparatively great so that when the gears are rotated no particular surface of them is subjected to wear, the wear of the gears being equalized. Even though gears are considerably worn their decrease in efficiency of operation is comparatively low so that it would be very difficult for a condition to arise which would cause the brake to become non-equalizing or even non-operative.

While brake operators of this type possess the foregoing advantages, they have the serious defect that none of them are equalizing.

The main object of this invention is to provide an equalizing operator for a brake.

Another object of this invention is to provide an equalizing brake which is actuated by means of intermeshing gears.

Another object of the invention is to provide an equalizing brake wherein intermeshing gears are mounted upon a floating member.

Yet another object of the invention is to provide a brake actuating element of such character that the wear on the particular parts thereof will be equally distributed.

With these and other objects in view, which may be incident to my improvements, the invention consists in the parts and combinations to be hereinafter set forth and claimed, with the understanding that the several necessary elements comprising my invention, may be varied in construction, proportions and arrangement without departing from the spirit and scope of the appended claims.

In order to make my invention more clearly understood, I have shown, in the accompanying drawings, means for carrying the same into practical effect without limiting the improvements in their useful applications to the particular constructions which, for the purpose of explanation, have been made the subject of illustration.

The present invention deals with equalizing brakes of the internal expanding type and consists of an operator for the brake shoes which is floated. One method of practically effecting the concept of this invention is to provide a floating member upon which is mounted intermeshing gears.

In order to make my invention more clearly understood, I have shown, in the accompanying drawings, means for carrying the same into practical effect without limiting the improvements in their useful applications to the particular constructions which, for the purpose of explanation, have been made the subject of illustration.

In the drawings:

Figure 1 is a sectional view through the vertical axis of the brake drum, showing one form of the invention.

Figure 2 is an enlarged sectional view taken along the line 2—2, of Figure 1 showing detailed construction of the operator.

Figure 3 is a sectional view taken along the vertical axis of the brake drum, and showing a modified form of the invention.

Figure 4 is a sectional view taken along the line 4—4 of Figure 3, showing the detailed construction of the operator.

Referring to the drawings, similar reference characters designate similar parts throughout the several views. In Figures 1 and 2, there is shown a brake drum 1 adapted to be secured by any suitable means to a wheel, not shown. The numeral 2 represents the usual backing plate associated with a brake drum of this type. Backing plate 2 is provided with a circular opening 3, through which an axle, not shown, may pass. Pivotally connected to the backing plate 2 as at 4 are brake shoes 5 adapted to engage the drum 1 to retard its rotation. Brake shoes 5 are provided with the usual friction lining 6, which engages the drum.

Springs 7 connected to the backing plate by any means 8 and to brake shoes as at 9, are provided to prevent the brake shoes from engaging the drum when the brake is not being applied. Obviously, if desired, a single spring or any other means for the purpose of preventing the brake shoes from normally engaging the drum may be used.

Mounted upon the backing plate 2 are guide ways 10 which are secured thereto by any suitable means such as screws or rivets 11. These guide ways are provided at each end with projections or stops 12. Adapted to slide in the guide ways is a carriage generally designated as 13 which is prevented from sliding out of the guide ways by reason of the stops 12. The carriage 13 comprises guide member 14, provided with brackets 15, shown in Figure 2, and a front plate or cover member 16, detachably secured to the brackets 15 by any desirable means such as screws 17. The guide member 14 and the cover member 16 of the carriage 13 are provided with bearings 18, positioned opposite each other and adapted to receive a shaft 19.

As shown in Figure 2, the end of the shaft 19, fitting in the bearing in the guide member 14, does not pass entirely through the guide member, while the end of the shaft held by the bearing in the cover plate 16 extends for some distance beyond the cover plate. Mounted upon the shaft 19 between the cover and guide member is a pinion 20. Pinion 20 may be secured to the shaft 19 in any desirable manner, such for example as being formed integral with the shaft. Securely fastened to the end of the shaft 19 which extends beyond the face of the cover plate 16 is a crank arm 21. This arm may be fastened to the shaft, if desired, by a set screw as shown in 22.

This construction allows the crank arm to rotate the pinion and at the same time allows the carriage 13 to move in the guideways 10.

To the free end of the crank arm 21 is shown a Bowden wire connection 23. Secured to connection 23 is a Bowden wire 24, which passes through any suitable opening in the backing plate, as shown at 25, and thence leads to the operating pedal. Upon the operator applying pressure to the pedal, the Bowden wire transmits the force to the crank arm and actuates it. Although I have shown a means for actuating the crank arm comprising a Bowden wire and a connection therefor, I wish it to be distinctly understood that I do not limit myself to this particular construction. Obviously any means for actuating the device could be employed.

Rack bars 26 are provided for engaging the pinion 20. One end of each bar is loosely pivoted to the brake shoes as shown at 27. A portion of the body of each rack bar 26 passes through the carriage so that its toothed side engages the pinion 20, and its opposite side bears against a bracket 15. This construction maintains the rack bars in constant engagement with the pinion. Preferably each end of the rack bar may be offset from the other end so as to allow considerable room for the arrangement of the other elements of the operator. However, this construction is not necessary, as the rack bar may be made perfectly straight, if desired.

Upon the rotation of the pinion in a counter clock-wise direction, the rack bar nearest the drum, or the one on the right, will be forced upwardly, while the rack bar on the left will be forced downwardly, thus causing the brake shoes 5 to be expanded so that they will engage the drum.

The method of operation of the brake is as follows: Upon the operator applying pressure to the brake pedal, near the driver's seat of the automobile, this force is transmitted by means of the Bowden wire to the crank arm 21 which rotates the arm and consequently the pinion secured to the shaft 19. Rotation of the pinion in a counter clockwise direction causes the rack bar on the right to be forced upwardly and the bar on the left to be forced downwardly. Since the rack bars are pivotally secured to the brake shoes, the shoes will be expanded and will engage the drum so as to retard its motion.

In the event that the lining of one of the brake shoes is worn to a greater degree than the lining of the other shoe, the carriage 12 will move in such a direction that both shoes will engage the drum with an equal retarding force.

Assuming for the purpose of illustration that the lining of the lower shoe is the more worn, upon the actuation of the pinion the upper shoe will first strike the drum. At this instant the lower shoe has not engaged the drum so that further rotation of the pinion causes it to move about the right rack bar as a fixed point. This causes the carriage 13 to be moved downwardly. Further rotation of the pinion now causes the lower shoe to engage the drum. The pinion, upon still further rotation, will cause both shoes to exert an equal frictional force upon the drum.

Should the lining of the upper brake shoe be the more worn, the converse of the above takes place.

Upon the driver releasing the pressure on the brake pedal, the springs 7 will retract the brake shoes towards the center of the drum so as to prevent their engagement therewith. The crank arm 21 and the pinion 20 rotate in a clock-wise direction, and the rack bar nearest the brake drum or the right rack bar is pulled downwardly, while the rack bar on the left, or farthest away from the drum is pulled upwardly. At the same time, the carriage 13 moves towards the position which it normally occupies when the brake is not being applied.

Figures 3 and 4 show a modification of the embodiment described in Figures 1 and 2. In Figures 3 and 4, 28 represents a brake drum which is secured to a wheel, not shown. 29 represents the usual stationary backing plate associated with the brake drum, which is provided with a circular opening 30, through which an axle, not shown, may pass.

Pivotally mounted upon the backing plate 29, as at 31, are brake shoes 32, which are adapted to engage the brake drum. The usual friction material 33 is provided upon the surface of the brake shoes.

Springs 34, each having one end secured to the stationary backing plate by any suitable means 35 and the other end secured to a brake shoe as at 36 are provided to normally maintain the brake shoes in a non-engaging position with respect to the drum. Although I have shown a plurality of springs for maintaining the brake shoes in a non-operative position, quite obviously a single spring, or any other means, may be employed for the same purpose.

The brake operator comprises a floating plate 37 which is substantially triangular in shape, and is mounted at its apex upon a conventional pivot 38 to the backing plate 29. By this construction the plate 37 is free to rotate about its apex as a center.

Floating plate 37 is provided with two fixed shafts 39 mounted thereon in any manner so as to prevent their rotation. Mounted upon the shafts 39 are intermeshing sector gears 40. Gears 40 are free to rotate upon the shafts 39. One of the gears 40 is provided with a crank arm 41.

Attached to the free end of the crank arm 41 is a connection 42 for a Bowden wire 43. This Bowden wire passes out of the drum through any suitable opening 44 and thence to the brake pedal.

I wish it to be distinctly understood that I do not limit myself to the particular Bowden wire construction shown to operate the gears as any conventional method of actuating them may be employed.

Upon the operator of the automobile applying pressure to the brake pedal, it is transmitted by means of the Bowden wire to the crank arm 41 which actuates sector gears 40. By its construction, the floating plate 37 is free to rotate about its pivot as a center while the gears are being actuated.

Pivotally secured to the gears 40 are linkage members 45. One end of each member 45 is pivotally connected at 46 to one of the gears and the other end thereof is pivotally connected at 47 to a brake shoe 32. Upon the lower sector gear being rotated in a clock-wise direction, the lower linkage member 45 will be forced downwardly, while the upper linkage member will be forced upwardly, thereby causing the brake shoes to expand so that they engage the brake drum.

The operation of the brake is as follows: The pressure applied by the driver of the automobile upon the brake pedal is transmitted by means of the Bowden wire 43 to the crank arm 41, causing this arm to rotate in a clock-wise direction, and, consequently, moving the sector gear to which it is connected in the same direction. Upon the rotation of the lower sector gear 40 in a clock-wise direction, the lower linkage member 45 is forced downwardly, and this causes the lower brake shoe 32 to engage the brake drum.

The upper sector gear, by reason of its engagement with the lower gear, is caused to rotate in a direction opposite from that of the lower gear, or in a counter clock-wise direction, while the upper linkage member connected to this sector gear and to the upper brake shoe is forced upwardly and causes the upper brake shoe to engage the drum.

The means employed in this modification for causing each shoe to engage the drum with an equal retarding force is similar to that used in the embodiment of the invention shown in Figures 1 and 2. Assuming that the lining of the lower shoe is the more worn, the upper shoe will first strike the drum since the distance between its lining and the drum is less than the distance between the lining of the lower shoe and the drum. At this stage, however, the lower shoe has not engaged the drum so that further rotation of the sector gears will cause the floating plate 37 to move downwardly about its pivot. Still further rotation of the gears causes the lower shoe to engage the drum. Both shoes are now in contact with the drum and upon the gears being turned further the brake shoes exert an equal force of retardation on the brake drum.

In the event that the lining of the upper shoe is the more worn the floating plate moves upwardly so as to cause equalization of the retarding force of the brake shoes.

Upon the pressure of the braking action being released the springs 34 return the brake shoes towards the center of the drum, so as to disengage them from retarding its motion. The sector gears now rotate in the opposite direction from that which they did when the brakes were being applied, and the floating plate rotates about its pivot to its normal position.

The operation of the brake mechanism will be appreciated from the foregoing description. It may be seen that because of the sliding carriage construction employed with the rack bars and because of the floating plate construction provided with the sector gears, the brakes will be equalized. It may also be seen that all parts of both operators will be subjected to wear which is evenly distributed over their surface, and, since intermeshing gears are used, this wear is relatively small.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a brake mechanism a drum, brake shoes associated therewith, an operator therefor comprising a freely slidable carriage and a pinion mounted thereon, a plurality of rack bars engaging the pinion, one end of each bar being connected to a brake shoe.

2. In a brake mechanism a drum, brake shoes associated therewith, a stationary backing plate for the drum, a floating operator mounted thereon comprising a slidable carriage, a pinion, rotatively mounted thereon, a plurality of rack bars engaging said pinion, one end of each rack bar being connected to a brake shoe and means for actuating said pinion to cause the brake shoes to frictionally engage the drum.

3. A vehicle wheel brake comprising a drum, a stationary backing plate therefor, a plurality of brake shoes pivoted thereto, guideways secured to the backing plate, a carriage adapted to slide in said guideways, a shaft journaled in said carriage, a pinion secured thereto, a plurality of rack bars engaging said pinion, one end of each rack bar being pivoted to a brake shoe, and means for actuating said pinion so as to cause the brake shoes to frictionally engage the drum.

4. A vehicle wheel brake comprising a drum, a stationary backing plate therefor, a plurality of internal brake shoes pivotally fastened thereto, guideways secured to the backing plate, a carriage adapted to slide therein, said carriage comprising a guide member, brackets positioned thereon, a cover member detachably secured thereto, bearings in each of said members, a shaft journaled in said bearings, a pinion secured thereto and positioned between the cover and guide members, a plurality of rack bars engaging the pinion, each rack bar passing between the pinion and a bracket, one end of each bar being pivotally connected to a brake shoe and means for actuating the pinion to cause the brake shoes to frictionally engage the drum.

5. In a floating brake operator, a drum, a backing plate therefor, a plurality of brake shoes pivoted thereon, a guideway secured thereto, a carriage, a pinion rotatively mounted thereon, a plurality of rack bars engaging said pinion, one end of each rack bar being connected to a brake shoe, said carriage adapted to slide in said guideways in a direction such that each brake shoe will frictionally engage the drum with an equal retarding force.

6. In a floating brake operator, a drum, a backing plate therefor, a plurality of brake shoes pivoted thereon, a guideway secured thereto, a carriage comprising a guide member, brackets positioned thereon, a cover member detachably secured thereto, a bearing in each of said members, a shaft journaled in the bearings, a pinion mounted thereon, said pinion being positioned between the cover member and the guide member, a plurality of rack bars, each rack bar extending through the carriage, the toothed side thereof engaging the pinion, the opposite side thereof bearing against a bracket, one end of each bar being pivoted to a brake shoe, said carriage guide member adapted to slide in said guideways in a direction such that each brake shoe will frictionally engage the drum with an equal retarding force.

In testimony whereof I affix my signature.

HARRY H. SEMMES.